United States Patent [19]

Hassel et al.

[11] Patent Number: 5,071,923

[45] Date of Patent: Dec. 10, 1991

[54] SURFACE-ACTIVE COPOLYMERS AND THEIR USE FOR THE PRODUCTION OF POLYURETHANE POWDERS

[75] Inventors: Tillmann Hassel, Cologne; Hanns P. Müller, Bergisch Gladbach; Hugo Vernaleken, Krefeld; Helmut Kipphardt, Hamburg; Rolf Dhein, Krefeld, all of Fed. Rep. of Germany

[73] Assignee: Bayer Aktiengesellschaft, Leverkusen, Fed. Rep. of Germany

[21] Appl. No.: 565,599

[22] Filed: Aug. 10, 1990

[30] Foreign Application Priority Data

Aug. 25, 1989 [DE] Fed. Rep. of Germany ....... 3928150

[51] Int. Cl.$^5$ ........................................... C08F 283/06
[52] U.S. Cl. .................................... 525/404; 525/445; 525/426; 525/467; 525/535; 525/537; 526/301; 526/289
[58] Field of Search .................. 526/301, 289; 528/49, 528/69; 525/445, 922, 404, 426, 467, 535, 537

[56] References Cited

U.S. PATENT DOCUMENTS

| | | | |
|---|---|---|---|
| 3,787,525 | 1/1974 | McGarr | 260/859 |
| 3,894,994 | 7/1975 | Day et al. | 260/75 NE |
| 3,925,295 | 12/1975 | Osborn | 525/445 X |
| 3,933,759 | 1/1976 | Hoeschele | 260/77.5 TB |
| 4,032,516 | 6/1977 | McGarr | 260/77.5 AA |
| 4,107,256 | 8/1978 | Conrad et al. | 264/310 |

FOREIGN PATENT DOCUMENTS 1486224  9/1977  United Kingdom .

OTHER PUBLICATIONS

Wester's New Collegiate Dictionary, pp. 689, 800.
The Condensed Chemical Dictionary, 9th Ed., pp. 527, 636.
Hackh's Chemical Dictionary, pp. 400, 473.

*Primary Examiner*—Joseph L. Schofer
*Assistant Examiner*—Mark Nagumo
*Attorney, Agent, or Firm*—Joseph C. Gil; Richard E. L. Henderson

[57] ABSTRACT

The present invention is directed to novel surface active copolymers and the use thereof in the production of polyurethane powders. More particularly, the copolymers comprise have a substantially linear structure and are obtained by copolymerization of A) a partial reaction product of
  1) (meth)acrylic acid or a derivative thereof and
  2) a macromolecular compound substituted by at least two functional groups selected from OH and $NH_2$, the functional groups not reacted with A1) being irreversibly blocked, with
B) a urethane of 1) a long-chain alkyl isocyanate and
  2) a hydroxyalkyl (meth)acrylate.

6 Claims, No Drawings

SURFACE-ACTIVE COPOLYMERS AND THEIR USE FOR THE PRODUCTION OF POLYURETHANE POWDERS

BACKGROUND OF THE INVENTION

This invention relates to new surface-active polymers and to their use for the direct production of polyurethane powders from the components in an organic carrier phase.

Polyurethane powders and their use on an industrial scale are known. The powders are normally expensively produced by grinding of corresponding granulates. Direct synthesis of the powders from the components in an organic carrier phase by suspension polymerization is much more economical, the best results being obtained when aliphatic and/or alicyclic hydrocarbons are used as the carrier phase.

Surface-active auxiliaries are essential for carrying out this direct synthesis. The function of the auxiliaries is to convert the reaction components into finely divided emulsions and to keep the polyurethane formed in emulsion or suspension until the reaction is over.

Special polyoxyalkylene/polydimethylsiloxane graft or block copolymers are proposed in German Auslegeschrift 2,816,170 as surface-active auxiliaries for the direct synthesis of polyurethane powders in a carrier phase of aliphatic hydrocarbons. However, polydimethyl siloxane-containing polymers are generally not favorable for polyurethane applications because they readily lead to surface defects in the moldings and to difficulties during painting, so that quantitative removal of these auxiliaries from the powder is essential. German Auslegeschrift 2,456,927 describes block or graft copolymers of polylactones and long-chain alkyl esters of (meth)acrylic acid and corresponding products of polyoxyalkylene glycols and long chain alcohol esters of (meth)acrylic acid as surface active auxiliaries for the direct production of polyurethane powders by suspension polymerization in a carrier phase of aliphatic hydrocarbons. These auxiliaries have the disadvantage that they are OH-functional and are thus incorporated in the polyurethane produced, which can result in changes in the mechanical properties of the products and, in addition, makes it impossible to reuse the auxiliaries.

German Auslegeschriften 2,556,945, 2,559,769 and 2,442,085 and U.S. Pat. Nos. 4,032,516 and 3,787,525 describe copolymers of N-vinyl pyrrolidone and long-chain α-olefins as surface-active auxiliaries for the direct synthesis of polyurethane powders in a hydrocarbon carrier phase. These auxiliaries cannot be incorporated, but are not easily desorbed from the surface of the powder formed so that elaborate washing operations are necessary to recover the auxiliaries.

The problem addressed by the present invention was to provide improved copolymers. Another problem addressed by the invention was to provide a process for the direct production of polyurethane powders which gave finely divided polyurethane dispersions and in which the emulsifiers used could readily be removed after formation of the powders.

DESCRIPTION OF THE INVENTION

The present invention relates to surface-active copolymers having a substantially linear structure, obtainable by copolymerization of A) a partial reaction product of
1) (meth)acrylic acid or a derivative thereof and
2) a macromolecular compound substituted by at least two functional groups selected from OH and NH$_2$, the functional groups not reacted with A1) being irreversibly blocked, with B) a urethane of 1) a long-chain alkyl isocyanate and 2) a hydroxyalkyl (meth)acrylate.

The surface-active copolymers thus produced cannot be incorporated, give polyurethane powders of smaller grain size than the known N-vinyl pyrrolidone/α-olefin copolymers for comparable synthesis conditions and, on completion of the reaction, are easily and almost quantitatively desorbed from the polyurethane powder, so that the powders do not have to be washed.

Both the surface activity and the ready desorbability of the surface-active auxiliaries according to the invention are surprising because the known surface-active auxiliaries for the direct synthesis of polyurethane powders, such as polyether/polydimethyl siloxanes and N-vinyl pyrrolidone/α-olefin copolymers are completely apolar in the parts of the molecule solvated by the hydrocarbon carrier phase while the graft copolymers according to German Auslegeschrift 2 456 927 bear only moderately polar ester groups in addition to the long-chain alkyl groups in the parts of the molecule solvatable by the carrier phase.

By contrast, the surface-active polymeric auxiliaries according to the invention, even in those parts of the molecule solvated by the external phase, comprise not only ester groups, but also high concentrations of highly polar urethane functions capable of forming hydrogen bridge bonds. It was not foreseeable to the expert that even substances such as these would be eminently suitable for the purposes of the invention. In addition, the ready desorbability of the auxiliaries according to the invention from the polyurethane powder formed is completely unexpected. On the contrary, it had been assumed that these substances would be very strongly adsorbed by the polyurethane powder because not only can they associate with the soft segment of the polyurethane, they can also be attached to the hard segments of the polyurethane by hydrogen bridges by virtue of their urethane content.

In one preferred embodiment, the macromolecular compounds A)2) are macropolyols, more especially macrodiols. Particularly preferred macropolyols are compounds containing on average at least 1.8 isocyanate-reactive hydrogen atoms and having molecular weights of generally from 400 to 10,000. Compounds such as these are understood to be compounds containing hydroxyl groups, more especially compounds containing 2 to 8 hydroxyl groups, especially those having molecular weights in the range from 450 to 6,000 and preferably from 600 to 4,500, for example polyesters, polyethers, polythioethers, polylactones, polycarbonates, polyester carbonates, polyether carbonates, polyacetals and polyester amides containing at least 2, generally 2 to 8 and preferably 2 to 4 hydroxyl groups. According to the invention, it is of particular advantage to use macropolyols having an OH functionality of 2 for the production of the auxiliaries. Linear products are obtained in this way.

Correspondingly useable polyester diols are, for example, reaction products of dihydric alcohols and dibasic carboxylic acids. The dicarboxylic acids may be aliphatic, cycloaliphatic, aromatic and/or heterocyclic and may optionally be substituted. They may even be used in the form of derivatives, such as anhydrides and esters, for the reaction with dihydric alcohols. Monohydroxy monocarboxylic acids are also suitable for the synthesis of the polyester diols. Examples of carboxylic acids such as these and derivatives thereof are succinic acid, adipic acid, suberic acid, azelaic acid, sebacic acid, phthalic acid, isophthalic acid, phthalic anhydride, tetrahydrophthalic anhydride, hexahydrophthalic anhydride, tetrachlorophthalic anhydride, endomethylene tetrahydrophthalic anhydride, glutaric anhydride, hydroxycaproic acid, terephthalic acid dimethyl ester and terephthalic acid bis-glycol ester.

Suitable dihydric alcohols are, for example, ethylene glycol, 1,2- and 1,3-propylene glycol, 1,4- and 2,3-butylene glycol, hexane-1,6-diol, octane-1,8-diol, neopentyl glycol, 1,4-bis-hydroxymethyl cyclohexane, 2-methylpropane-1,3-diol, diethylene glycol, triethylene glycol, tetraethylene glycol and higher polyethylene glycols, dipropylene glycol and higher polypropylene glycols and dibutylene glycol and higher polybutylene glycols.

The polyether diols which may advantageously be used in accordance with the invention are also known per se and are obtained, for example, by polymerization of epoxides, such as ethylene oxide, propylene oxide, butylene oxide, tetrahydrofuran, styrene oxide or epichlorohydrin, on their own, for example in the presence of the Lewis catalysts, such as $BF_3$, or by addition of these epoxides, preferably ethylene oxide and propylene oxide, optionally in admixture or successively, onto starter components containing reactive hydrogen atoms, such as water, ethylene glycol, 1,3- or 1,2-propylene glycol, 4,4'-dihydroxydiphenyl propane, aniline, and methylamine. In many cases, it is preferred to use polyethers predominantly containing primary OH groups (up to 90% by weight, based on all the OH groups present in the polyether). Polybutadienes containing OH groups are also suitable for use in accordance with the invention.

Among the polythioether diols, condensates of thiodiglycol on its own and/or with other glycols, dicarboxylic acids, formaldehyde and/or aminocarboxylic acids are mentioned in particular. Depending on the co-components, the products are, for example, mixed polythioether diols, polythioether ester diols or polythioether ester amide diols. Polylactone diols are the products obtained when a monolactone is subjected to ring-opening polymerization using one of the above-mentioned diols as starter. Suitable lactones are, for example, butyrolactone and ε-caprolactone.

Polycarbonate diols are known per se and may be obtained, for example, by reaction of diols, such as propane-1,3-diol, butane-1,4-diol and/or hexane-1,6-diol, diethylene glycol, triethylene glycol, tetraethylene glycol or thiodiglycol, with diaryl carbonates, for example diphenyl carbonate, or phosgene (German Auslegeschriften 1,694,080, 1,915,908 and 2,221,751; German Offenlegungsschrift 2,605,024). If short-chain polyether diols or polyester diols are used instead of the diols for this reaction, polyether carbonate or polyester carbonate diols are formed.

Suitable polyacetal diols are, for example, the compounds obtainable from glycols, such as diethylene glycol, triethylene glycol, 4,4'-dioxyethoxy diphenyldimethyl methane, hexane diol and formaldehyde. Polyacetal diols suitable for the purposes of the invention may also be obtained by polymerization of cyclic acetals, such as for example trioxane (German Offenlegungsschrift 1,694,128). The polyester amide diols and polyamide diols include, for example, the linear condensates obtained from dibasic saturated carboxylic acids or anhydrides thereof and dihydric saturated aminoalcohols, diamines and mixtures thereof.

Macropolyamines, particularly macrodiamines may also be used as the macromolecular compounds A2). Macropolyamines may be obtained, for example, from polyether polyols by direct reaction with ammonia in accordance with German Auslegeschrift 1,215,373. However, the macropolyols may also be converted into isocyanate prepolymers by reaction with diisocyanates, preferably aromatic diisocyanates, and the prepolymers obtained subsequently hydrolyzed to form the aminoterminated compounds.

Particularly preferred compounds A2) are polyester diols, polyamide diols, polyether diols, polythioether diols, polylactone diols, polycarbonate diols, polyether carbonate diols, polyacetal diols and polyamide diols.

According to the invention, the functional groups of the compounds A2) are partly irreversibly blocked, in particular by etherification, esterification with monocarboxylic acids or urethanization with monofunctional isocyanates, preferably no polymerizable double bonds being present in the blocked compound A2). The remainder is converted into (meth)acrylate or (meth)acrylamide functions. The reaction product A obtained thus contains no NCO-reactive groups.

Component A2) may be partly etherified by known methods, for example by Williamson's ether synthesis or by reaction with alkyl tosylates. It is readily possible, particularly in the case of polyether and polyether carbonate diols, to carry out the partial termination during their actual synthesis by using the corresponding quantity of a monofunctional alcohol in the starter mixture. In principle, the alkyl radical of the terminal ether groups thus produced may have any structure, although the alkyl radicals are generally short-chain unbranched alkyl radicals.

Known methods are also used for the partial esterification of the hydroxyl functions of component A2), including for example acylation with acid chlorides of monocarboxylic acids in solution or transesterification reactions in bulk, such as the reaction with, for example, phenyl esters of monocarboxylic acids with elimination of phenol. It is possible, particularly in the case of polyester diols, to carry out the partial introduction of terminal ester groups during the actual synthesis by introducing corresponding quantities of monofunctional alcohols or monobasic carboxylic acids into the reaction mixture.

Similarly, in the case of polylactone diols, the desired quantity of a monofunctional alcohol may be added to the diol used to start the lactone polymerization.

Syntheses such as these give terminal ester groups of which the terminal alkyl radical emanates either from the alcohol used or from the monocarboxylic acid. The foregoing observations on terminal ether groups apply equally to the structure of the terminal alkyl radicals.

For partial urethanization with monoisocyanates, component A2) is reacted with the desired quantity of monoisocyanates in bulk or in solution under known reaction conditions. Any aliphatic and aromatic monoisocyanate may be used, although it is preferred to use aromatic monoisocyanates, among which phenyl isocyanate is particularly preferred.

The percentage content of the functional groups of component A2) thus blocked may be between 20 and 70%, particularly effective auxiliaries being obtained when 30 to 60% and preferably 40 to 50% of all the OH groups present in the macrodiols used for their synthesis are blocked as described. The remaining functional groups, particularly OH groups, are converted into (meth)acrylate functions or the NH$_2$ groups into amide functions, again in known manner, by reaction with component A1), such as acylation with (meth)acryloyl chloride in solution or transesterification with, for example, phenyl(meth)acrylate in bulk with elimination of phenol. The acylation reactions described may be carried out successively, although it is also possible to react the macrodiols simultaneously with activated monocarboxylic acid derivatives and activated (meth)acrylic acid derivatives in a one-pot reaction.

Hydroxyl groups of component A2) may of course also be converted into terminal (meth)acrylate groups by reaction with a monoisocyanate containing a (meth)acrylate function, such as for example isocyanatoethyl (meth)acrylate, to form the urethane.

These methods give OH-free modified macrodiols suitable for the purposes of the invention which, through their terminal (meth)acrylate groups, are copolymerized with urethanes from long-chain monofunctional alkyl isocyanates and hydroxyalkyl (meth)acrylates by standard methods (Houben-Weyl: Methoden der organischen Chemie; Vol E20; pages 1141 to 1176, Thieme Stuttgart 1987) to form the polymeric auxiliaries according to the invention. An alternative route to the same products comprises first partly reacting the macrodiols with corresponding (meth)acrylic acid derivatives in the described manner, copolymerizing the resulting OH-containing products with (meth)acrylurethanes in accordance with the invention and only then blocking the hydroxyl function as described. Finally, hydroxyalkyl (meth)acrylates may also be used as a component in the starter mixture for polyether and polylactone diol syntheses and the resulting acrylate-modified polyethers and polylactones copolymerized with (meth)acrylurethanes in accordance with the invention, the hydroxyl functions still present being blocked as described before or after the copolymerization.

Urethanes B) suitable for copolymerization are obtained by reaction of OH-monofunctional hydroxyalkyl (meth)acrylates with monofunctional alkyl isocyanates. Suitable hydroxyalkyl esters, component B2), for the production of these urethanes are, for example, 2-hydroxyethyl acrylate, 2-hydroxypropyl acrylate, 4-hydroxybutyl acrylate, 6-hydroxyhexyl acrylate and, preferably, the corresponding methacrylates. The alcohol component of these hydroxyalkyl esters mentioned by way of example is derived from optionally branched, aliphatic C$_2$ to C$_{10}$ diols. Esters such as 2-hydroxyethyl methacrylate and 4-hydroxybutyl methacrylate, of which the alcohol component is derived from C$_2$ and C$_4$ diols, are preferred.

Suitable monoisocyanates B1) for the production of these urethanes are derived from optionally branched aliphatic monoamines of which the carbon chain contains from 6 to 30, preferably from 10 to 20 and, more preferably, 18 carbon atoms. Examples of isocyanates such as these are 2-ethylhexyl isocyanate, decyl isocyanate, dodecyl isocyanate, tetradecyl isocyanate, hexadecyl isocyanate, stearyl isocyanate, eicosyl isocyanate and tetraeicosyl isocyanate. Preferred isocyanates are decyl isocyanate, palmityl isocyanate, myristyl isocyanate and stearyl isocyanate. These isocyanates may also be used in the form of mixtures.

Preferred compounds B may be obtained from B2) mono(meth)acrylates of optionally branched, aliphatic C$_2$ to C$_{10}$ diols, preferably C$_2$ and C$_4$ diols, and B)1) optionally branched, aliphatic C$_6$ to C$_{30}$ monoisocyanates, preferably C$_{10}$ to C$_{20}$ monoisocyanates and, more preferably, C$_{18}$ monoisocyanates as compound.

Component A preferably has an affinity for the soft segment of the polyurethane powder to be synthesized, while the long-chain alkyl radicals of component B provide the contact with the hydrocarbon carrier phase. The dispersion properties of the copolymers according to the invention may be regulated through the ratio by weight of A to B. Copolymers suitable for the purposes of the invention are actually obtained when only 5% by weight correspond to component A. On the other hand, copolymers which derive two thirds of their weight from component A are also suitable. However, it is more favorable to approximate the ratios by weight of A and B, for example to adjust them between 0.5:1 and 1.5:1 and more especially to 1:1.

Particularly preferred copolymers contain recurring units of the following polymerized comonomers I and II:

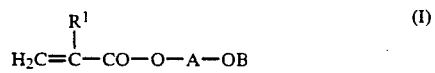

wherein R$^1$ represents H, CH$_3$,
A is the residue of a diol having a molecular weight of 400 to 10,000 after removal of the terminal OH groups,
B is the residue of a blocking agent, more particularly

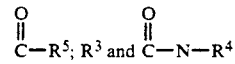

wherein R$^5$ and R$^3$ represent an optionally branched, aliphatic C$_1$ to C$_6$ alkyl radical,
R$_4$ is an optionally branched, aliphatic, cycloaliphatic or aromatic C$_1$ to C$_6$ radical,
and

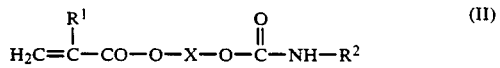

wherein R$^1$ represents H or CH$_3$,
X is an optionally branched aliphatic C$_2$ to C$_{10}$ and, more particularly, C$_2$ to C$_4$ alkylene radical,
R$^2$ is an optionally branched aliphatic C$_6$ to C$_{30}$, preferably C$_{10}$ to C$_{20}$ and more preferably C$_{18}$ alkyl radical.

Depending on the polymerization method, these recurring units may be distributed statistically or in blocks in the copolymer.

The present invention also relates to a process for the direct production of polyurethane powders in finely divided form by reaction of polyisocyanates and isocyanate-reactive compounds in a carrier phase using surface-active compounds, characterized in that a copolymer according to the invention is used a$ the surface-active compound.

The copolymers according to the invention enable polyurethane powders to be directly produced from polyisocyanates, macropolyols, macropolyamines, chain-extending agents and, optionally, chain regulators and other auxiliaries and additives in an aliphatic and/or alicyclic hydrocarbon carrier phase when they are added to the system.

Basically, all known aromatic, alicyclic and aliphatic polyisocyanates are suitable for this synthesis, although diisocyanates corresponding to the formula $Q(NCO)_2$, in which Q is an aromatic $C_6$ to $C_{15}$ hydrocarbon radical, an aliphatic hydrocarbon radical, a cycloaliphatic or mixed aliphatic-cycloaliphatic $C_2$ to $C_{15}$ hydrocarbon radical, are particularly suitable for the synthesis of linear products. Examples of such diisocyanates are toluene diisocyanate, naphthylene diisocyanate, diphenyl methane diisocyanate, hexamethylene diisocyanate, isphorone diisocyanate, cyclohexane-1,4-diisocyanate and perhydrodiphenyl methane diisocyanate. These isocyanates may also be used in the form of mixtures.

The polyester, polyether, polythioether, polylactone, polycarbonate, polyester carbonate, polyether carbonate, polyacetal and polyester amide polyols described above may be used as macropolyols in the synthesis of the polyurethane. In this case, too, it is particularly favorable to use macropolyols having an OH functionality of 2.

The polyamines obtainable from the macropolyols as described above may be used as the macropolyamines. In this case, too, it is particularly favorable to use macrodiamines. The use of macropolyols is particularly preferred.

Suitable chain-extending agents are the short-chain alcohols, amines and aminoalcohols having an isocyanate functionality of two typically used in polyurethane chemistry. Examples of such compounds are alcohols, such as ethylene glycol, butane-1,4-diol, hexane-1,6-diol, neopentyl glycol, hydroquinone bis-2-hydroxyethyl ether, 1,4-cyclohexane diol, diethylene glycol, 4,4'-dihydroxydicyclo-hexyl methane; amines, such as ethylene diamine, N,N'-dimethyl ethylene diamine, 1,6-diaminohexane, isophorone diamine, 4,4'-diaminodicyclo-hexylmethane, N,N',N'',-trimethyl diethylene triamine, piperazine and aminoethyl piperazine. Ethanol amine and N-2-hydroxyethyl piperazine are mentioned as examples of aminoalcohols.

Chain regulators may also be used to regulate the molecular weight of the polyurethane powders directly obtainable in accordance with the invention, as known to the expert. Chain regulators are monofunctional isocyanates, alcohols and/or amines, such as for example butyl isocyanate, phenyl isocyanate, ethanol, isopropanol, decanol or dibutyl amine, hexyl amine, morpholine.

Other auxiliaries and additives are understood to be the catalysts known to the expert in polyurethane chemistry, such as for example tin (II) octoate, dibutyl tin dilaurate, titanium tetrabutylate, iron(II) acetyl acetonate, diazabicyclooctane and N,N,N',N'-tetramethyl ethylenediamine. Other additives are, for example, fillers and reinforcing materials, such as glass fibers, carbon fibers, $TiO_2$, diatomaceous earth, aromatic polyamides, liquid crystalline polyesters, even in ground form, silica flour and polyureas, and also dyes, such as inorganic or organic pigments. Additives such as these are insoluble in the hydrocarbon phase and are advantageously incorporated in the macropolyols used before the direct synthesis of the polyurethane powder is carried out.

According to the invention, the direct synthesis of the polyurethane powder is preferably carried out in a hydrocarbon carrier phase in the presence of the copolymers according to the invention. The quantity of copolymers to be added may vary within wide limits, for example from 0.05 to 10% and advantageously from 0.5 to 5%, based on the total weight of the polyurethane to be produced. Particularly favorable results in regard to grain size are obtained when 1 to 3% of copolymer are used.

Hydrocarbons are preferred as the carrier phase for the processes according to the invention, the boiling points or boiling ranges preferably corresponding to the desired reaction temperature. Accordingly, it is possible to use hydrocarbons having boiling points in the range from 40° C. to 200° C., a boiling range of 60° C. to 150° C. normally being preferred. Boiling ranges of the carrier phase of 80° C. to 120° C. are particularly favorable by virtue of the simple separation and rapid drying of the polyurethane powder. The hydrocarbons may be used as pure substances and also in the form of mixtures. It is most economical to use dearomaticized petroleum fractions which boil in the above-mentioned ranges.

In the production of polyurethane powders in accordance with the invention in a hydrocarbon carrier phase, the powders are obtained in the form of sedimenting suspensions from which the products are separated off, for example by filtration. The solids content of these suspensions may vary, for example from 10 to 60%. In the interests of high volume-time yields, relatively high solids contents are favorable, although synthesis of the powder is easier to carry out at solids contents of up to 50%. Accordingly, solids contents of 20 to 50% are preferred, solids contents of 30 to 40% being particularly preferred.

The synthesis according to the invention is preferably carried out at temperatures in the range from 40° C. to at most 140° C. and preferably at temperatures in the range from 50° C. to 100° C., optimal reaction temperatures being in the range from 60° C. to 80° C.

In principle, the synthesis of polyurethanes in bulk can be carried out by various processes. Either all the components are mixed and reacted ("one-shot" process) or a pre-adduct is initially prepared from macropolyol and polyisocyanate and reacted with the chain-extending agent in a second reaction stage (prepolymer method). It is known that polyurethane plastics thus produced, despite the same overall composition, differ in their applicational properties according to the synthesis method. According to the invention, both methods, or variants thereof, are suitable for the direct production of polyurethane powders in a hydrocarbon carrier phase. For example, the macropolyol and chain-extending agent may be emulsified in the carrier phase and the desired quantity of polyisocyanate subsequently added. It is also possible initially to introduce the polyisocyanate with emulsifier in the carrier phase and then to add the macropolyol mixed with the chain extending agent. According to the invention, a particularly preferred variant of this one-shot process comprises initially introducing the polyisocyanate and the surface-active auxiliary in the carrier phase, heating the system to the boiling temperature and adding the macropolyol and the chain-extending agent, optionally in admixture, dropwise to the boiling mixture. Simple temperature control is possible in this way. The desired reaction temperature may be adjusted by corresponding choice of the carrier phase. On the other hand, the macropolyol and polyisocyanate may also be reacted in bulk to the prepolymer, the prepolymer subsequently emulsified in the carrier phase by means of the surface-active substances according to the invention and the resulting emulsion reacted with chain-extending agents as described above.

Finally, the prepolymer process may also be carried out by initially introducing the chain-extending agent together with the auxiliaries according to the invention in the carrier phase and subsequently adding the NCO prepolymer.

According to the invention, the direct synthesis of the polyurethane powders is carried out in the presence of the surface-active auxiliaries according to the invention. Although it is possible using one and the same auxiliary to produce polyurethane powders with a different macropolyol component (for example, polyurethane powder may readily be produced from 4,4'-diisocyanatodiphenyl methane, butane diol and butane diol polyadipate using an auxiliary synthesized with a caprolactone polymer) it is particularly preferred to use auxiliaries of which the modified polyol component is chemically similar to or identical with the soft-segment polyol of the polyurethane. The quantity of auxiliary required and/or the particle size of the powder may thus be minimized.

The invention is further illustrated but is not intended to be limited by the following examples in which all parts and percentages are by weight unless otherwise specified.

EXAMPLES

EXAMPLE 1

Copolymer with Polycaprolactone Component

A: Caprolactone component 114 g caprolactone are degassed and heated under nitrogen to 150° C. 1.29 g hydroxyethyl methacrylate and a catalytic quantity of dibutyl tin dilaurate are then added, followed by stirring for 3 hours at 150° C. The product is dissolved in 115 g toluene.

B: Urethane component 65 g hydroxyethyl methacrylate are dissolved in 214.4 g toluene 100 mg dibutyl tin dilaurate are introduced and 147.5 g stearyl isocyanate are then added dropwise at room temperature, followed by heating under reflux until the solution is free from NCO. 198 g of this solution (=99 g urethane) are diluted with 100 g toluene and 30 mg dibenzoyl peroxide are then added.

C: Copolymer

The dibenzoyl-peroxide-containing solution B is added dropwise under nitrogen to solution A over a period of 1 hour at 100° to 110° C. After stirring for 3 hours at 110° C., the solvent is removed by concentration in a rotary evaporator. 214 g of a hard-wax-like product are obtained. 50 g of this product are dissolved in 50 ml toluene. 25.94 g of a 1% phenyl isocyanate solution in toluene are then added dropwise, followed by stirring for 2 hours at 40° C. The solvent is then removed. Yield: 50 g.

EXAMPLE 2

Copolymer with Polyester Component

A: Polyester component 112.5 g if a butane diol polyadipate (M =2,250, OH functionality 2) are dissolved in 400 g toluene. 7.9 g pyridine are introduced and 3.14 g acetyl chloride in 10 ml toluene are added dropwise at room temperature. After stirring for 1 hour at room temperature, 6.27 g methacryloyl chloride in 25 ml toluene are added dropwise. The mixture is then stirred for 1 hour at room temperature and then for 1 hour under reflux. After cooling, the pyridine hydrochloride is filtered off under suction, the organic phase is washed with 2N HCl until it is free from pyridine, dried ($CaCl_2$+$MgSO_4$), filtered and concentrated. 118 g product are obtained and then diluted with toluene to form 245 g solution.

B: Copolymerization

The urethane is prepared from hydroxyethyl methacrylate and stearyl isocyanate as in Example 1 and dissolved in toluene together with 30 mg dibenzoyl peroxide (112.5 g product in 326 g solution). This solution is then added dropwise over a period of 1 hour under nitrogen to solution A initially introduced at 100° C. After stirring for 3 hours at 100° to 110° C., the toluene is removed, ultimately in a high vacuum at 110° C. to 120° C. A viscous oil is obtained, solidifying on cooling to form a hard-wax-like mass.

EXAMPLE 3

Copolymer with Polyester Component 454 g of a toluene solution of the polyester component are prepared as in Example 2A. A solution of 60 mg dibenzoyl peroxide and 448 g of the stearyl urethane of Example 2B in 752 g toluene is then added dropwise to this solution under nitrogen over a period of 5 hours at 110° C. After stirring for hours at 110° C., the solution is concentrated, ultimately at 0.1 mbar/110° C. The highly viscous mass is poured onto a metal plate on which it solidifies. Yield: 664 g.

EXAMPLE 4

1,153 g of a toluene solution of the polyester component used in Example 3 are prepared as in that Example (content: 558.37 g polyester component). This solution is reacted as in Example 3 with 670 g of the stearyl urethane of Example 2B dissolved in 1,252 g toluene. 0.179 g dibenzoyl peroxide as radical initiator are homogeneously dissolved in the urethane solution before the reaction. Working up gives 1,200 g of a hard-wax-like product.

EXAMPLE 4A

The auxiliary having the same overall composition as in Example 4 is prepared by another polymerization method: 279.6 g of the polyester component and 335.5 g of the urethane component are each dissolved in toluene to form a 1 liter solution. 0.054 g dibenzoyl peroxide is added to each solution. The solutions thus prepared are synchronously added dropwise with stirring to 100 ml toluene over a period of 3 hours. The polymerization is carried out under nitrogen. After stirring for 12 hours at room temperature, the toluene is distilled off, ultimately in a high vacuum at 80° C. The viscous product is poured onto a metal plate on which it solidifies. 610 g Product are obtained.

EXAMPLE 5

Copolymer with Polyether Component

A: Polyether component 25 g of an OH-difunctional polytetrahydrofuran (M =1,000) and 50 g of an OH-difunctional polytetrahydrofuran (M =2,000) are mixed, the resulting mixture freed from water for 30 minutes at 110° C./15 mbar and then dissolved in 400 g toluene. 7.9 g pyridine are introduced, 3.14 g acetyl chloride in 10 ml toluene are added dropwise at room temperature and, after stirring for 1 hour, 6.27 g methacryloyl chloride in 25 ml toluene are added dropwise. The mixture is then refluxed for 1 hour, cooled, the pyridine hydrochloride isolated by filtration under suction and the product subsequently concentrated. The residue is taken up in methylene chloride, washed with 2N HCl and H₂O, dried, filtered and concentrated. 71 g of a terminal-group-modified polyether mixture are obtained and dissolved in 115 g toluene.

B: Copolymer

A solution of 30 mg dibenzoyl peroxide and 142 g of stearyl urethane in 143 g toluene are added dropwise under nitrogen to solution A over a period of 4 hours at 110° C. Towards the end of the dropwise addition, the solution is diluted with 400 ml toluene for reasons of viscosity. After stirring for 3 hours at 110° C., the product is concentrated. Yield: quantitative.

EXAMPLE 6

2.2 g of the copolymer of Example 1 are introduced into 118.5 g ligroin (boiling point around 90° C.) 50 g of a dehydrated butane diol/adipic acid polyester (M=2,250, F=2) and 5 g butane-1,4-diol are added at 65° C. with vigorous stirring (blade stirrer, 1,200 rpm). 20 g solid 4,4'-diisocyanatodiphenyl methane and about 0.1 g dibutyl tin dilaurate are then added. The temperature falls slightly at first and then rises rapidly to 90° C. The mixture is stirred at 65° C. until the carrier phase is NCO-free (2 hours) and, after cooling, the solid is separated off and dried in air. A free-flowing powder is obtained.

Yield: 70 g powder having a particle size of <400μ

Sieve analysis: 400μ<29.6%>200μ<61.7%>16-0μ<5.36% 125μ<4.58%>80μ<0.94%>0μ.

The sieve analysis data represent the proportion by weight of powder which, after shaking for 1 hour on a shaking machine, did not fall through the corresponding standard sieve according to DIN 4188.

EXAMPLE 7

The procedure was as in Example 6, except that 2.2 g of the copolymer of Example 2 were used. 68 g of a free-flowing powder having a particle size of <400μ were obtained.

Sieve analysis: 400μ<0.9%>200μ<25.2%>16-0μ<45.6%>125μ<27.74%>80μ<2.34%>0μ.

EXAMPLE 8

Recycling of the Mother Liquor

The mother liquor of an experiment identical with Example 7, which has been obtained solely by suction filtration without washing, is made up to the initial weight and used as carrier phase for a repetition of Example 7 with the difference that no new copolymer is added. 69 g of a free-flowing powder having the following sieve analysis are obtained:

400μ<19.72%>200μ<61.84%>16-0μ<9.72%>125μ<7.64%>80μ<3.72%>0μ.

EXAMPLE 9

(Comparison Example with the Surfactants According to Example 2 of U.S. Pat. No. 4,032,516)

The procedure is as in Example 7, except that 2.2 g of an N-vinyl pyrrolidone hexadecene copolymer having an average molecular weight of 7,300 are used as emulsifier. The polyurethane powder obtained is coarser than in Example 7 and has the following particle size distribution:

400μ<8.2%>200μ<84.8%>160μ<7.2%>12-5μ<2%>80μ<0.4%>0μ.

After making up to the initial weight, the mother liquor obtained in Example 9 was reused as carrier phase and the experiment was repeated without the addition of new emulsifier. No powder was formed, instead the polyurethane precipitated in the form of lumps.

EXAMPLE 10

2.16 kg 4,4'-diisocyanatodiphenyl methane are introduced into a 45-liter stirred vessel equipped with an anchor stirrer, reflux condenser and heatable dropping funnel and heated to 90° C. 0.222 kg copolymer of Example 3 is added with gentle stirring. 20.453 kg ligroin are then run in, care being taken to ensure that the internal temperature does not fall below 90° C. 4.5 g dibutyl tin dilaurate are added and the mixture is heated under reflux (92° C.). A mixture heated to 100° C. of 1.9125 kg of an OH-difunctional adipic acid/butane diol polyester (M=2,250), 0.3375 kg of an OH-difunctional adipic acid/hexane diol polyester (M=2,000) 0.709 kg butane-1,4-diol and 0.0171 kg n-octanol are run in under reflux over a period of 40 minutes at a stirring speed of 250 r.p.m. After stirring under reflux for 1.5 h, the mixture is cooled to 25° C. and the polyurethane powder formed is separated off from the carrier phase.

Yield: 5.033 kg of a free-flowing powder having the following particle size distribution:

400μ<57.5%>200μ<14.6%>160μ<8.1%>12-5μ<15.2%>80μ<4.2%>0μ.

EXAMPLE 11

110 g 4,4'-diisocyanatodiphenyl methane and 13.2 g of the copolymer of Example 5 in 537 g ligroin are introduced into a two-liter reaction vessel equipped with an anchor stirrer, dropping funnel and reflux condenser and heated to the reflux temperature (92° C.). 2 g dibutyl tin dilaurate are then added, after which a hot (100° C.) mixture of 100 g polytetrahydrofuran (OH number 112, functionality 2), 100 g polytetrahydrofuran (OH number 56, functionality 2), 26 g butane-1,4-diol and 1.4 g carnauba wax is run in over a period of 25 minutes with stirring (250 r.p.m). After stirring under reflux for 1 hour, the mixture is cooled with stirring to room temperature, the powder is filtered under suction and dried.

Yield: 320 g

Sieve analysis. 400μ<51.07%>200μ<48.02%>16-0μ<0.8%>125μ<0.1%>80μ.

EXAMPLE 12

A mixture of 25 g polytetrahydrofuran (M=1,000, OH number=112) and 25 g polytetrahydrofuran (M=2,000, OH number=56) is reacted with 27.5 g 4,4'-diisocyanatodiphenyl methane to form the NCO prepolymer. The prepolymer thus formed is added dropwise over a period of 30 minutes at 90° C. to a boiling (92° C.), rapidly stirred (1,300 r.p.m) mixture of 6.5 g butane-1,4-diol, 3.3 g copolymer of Example 5, 0.1 g dibutyl tin dilaurate and 133 g ligroin. After stirring under reflux for 1 hour, the mixture is cooled to room temperature. The powder formed is filtered under suction and dried.

Yield: 75 g

Sieve analysis: 400μ<68.9%>200μ<29.6%>16-0μ<14.66%>125μ.

EXAMPLE 13

13.2 g hexamethylene diisocyanate and 3.96 g copolymer of Example 4 and also 0.5 ml dibutyl tin dilaurate in 310 g ligroin are initially introduced into a round-bottomed flask equipped with a paddle stirrer, reflux condenser and dropping funnel. A mixture of 48 g butanediol adipate (F=2, OH number=49.8); 12 g hexanediol/neopentyl glycol polyadipate (F=2, OH number=56) and 4.8 g butane-1,4-diol is added dropwise (hot at 100° C.) over a period of 18 minutes under reflux (92° C.) with stirring (1300 r.p.m.). The mixture is stirred under reflux at high speed for 2 hours and then slowly for 8 hours at 70° C., cooled and the powder filtered under suction.

Yield: 75 g

Sieve analysis: 400µ<8.68%>200µ<49.13%>160µ<36.1%>125µ<5.68%>80µ<0.4%>0%.

EXAMPLE 14 (COMPARISON EXAMPLE)

The procedure is as in Example 13, except that the copolymer used there is replaced by 3.96 g of the emulsifier of Example 9. Although lumps are formed when the polyol mixture is added dropwise, the mixture remains stirrable. The product obtained after stirring and working up as in Example 13 was not a powder, but consisted of irregularly shaped lumps with cross sections of up to 2 cm.

EXAMPLE 15

An NCO prepolymer is prepared as in Example 12 from 50 g of the polytetrahydrofuran mixture used in that Example and 27.5 g 4,4'-diisocyanatodiphenyl methane. 3.3 g of the copolymer used in Example 12 are added to the prepolymer thus prepared. 133 g ligroin are then slowly added with stirring at 92° C., followed by the addition of 0.1 g dibutyl tin dilaurate. 6.5 g butane-1,4-diol are added over a period of 50 minutes under reflux (92° C.) and with rapid stirring (1,300 r.p.m). The mixture is then stirred and worked up as in Example 12.

Yield 80 g powder

Sieve analysis 400µ<71%>200µ<29%>160µ.

EXAMPLE 16

The procedure is as in Example 6, except that 3.3 g of the copolymer of Example 4A are used.

Yield: 69 g powder

Sieve analysis: 400µ<43.42%>200µ<37.79%>160µ<14.17%>125µ<4.22%>80µ<0.4%>0µ.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A surface-active copolymer having a substantially linear structure, obtained by copolymerization of
   A) a partial reaction product of
      1) (meth)acrylic acid or a derivative thereof and
      2) a macromolecular compound substituted by at least two functional groups selected from OH and $NH_2$, wherein the functional groups of any portion of component A2) that are not reacted with component A1) are irreversibly blocked,
   with
   B) a urethane of 1) a monofunctional alkyl isocyanate containing from 6 to 30 carbon atoms and 2) a hydroxyalkyl (meth)acrylate.

2. The copolymers of claim 1, wherein the macromolecular compound of component A2) is a macropolyol.

3. The copolymers of claim 1, wherein the macromolecular compound of component A2) is selected from the group consisting of polyester diols, polyether diols, polythioether diols, polylactone diols, polycarbonate diols, polyether carbonate diols, polyacetal diols and polyamide diols having molecular weights in the range from 400 to 10,000.

4. The copolymers of claim 1, wherein the macromolecular compound of component A2) is a macrodiol, wherein 20 to 70% of the hydroxyl groups of component A2) are blocked by etherification, by esterification with monocarboxylic acids, or by urethanization with monofunctional isocyanates and the remaining hydroxyl groups of component A2) are converted into (meth)acrylate functions, and wherein the macrodiols thus modified are copolymerized through said (meth)acrylate functions with urethanes B).

5. The copolymers of claim 1, wherein mono(meth)acrylates of optionally branches, aliphatic $C_2$ to $C_{10}$ diols and optionally branched, aliphatic $C_6$ to $C_{30}$ monoisocyanates are respectively used as component B2) and isocyanate component B1).

6. The copolymers of claim 1, wherein the ratio by weight of component A to component B in the copolymer is from 0.05:1 to 2:1.

* * * * *